(12) United States Patent
Baligh et al.

(10) Patent No.: US 9,681,324 B2
(45) Date of Patent: Jun. 13, 2017

(54) METHOD AND CONTROLLER FOR LOW-OVERHEAD USER EQUIPMENT MEASUREMENTS

(71) Applicant: Huawei Technologies Co., Ltd., Shenzhen (CN)

(72) Inventors: Mohammadhadi Baligh, Kanata (CA); Keyvan Zarifi, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 14/528,878

(22) Filed: Oct. 30, 2014

(65) Prior Publication Data
US 2016/0127935 A1   May 5, 2016

(51) Int. Cl.
*H04W 24/10* (2009.01)
*H04W 48/16* (2009.01)
*H04W 48/20* (2009.01)

(52) U.S. Cl.
CPC ............ *H04W 24/10* (2013.01); *H04W 48/16* (2013.01); *H04W 48/20* (2013.01)

(58) Field of Classification Search
CPC .............................. H04W 24/10; H04W 72/044
USPC ......................................................... 370/252
See application file for complete search history.

(56) References Cited

U.S. PATENT DOCUMENTS

| | | | |
|---|---|---|---|
| 2011/0188457 A1 | 8/2011 | Shu et al. | |
| 2013/0344877 A1* | 12/2013 | Ma | H04W 16/04 455/446 |
| 2014/0302856 A1* | 10/2014 | Nory | H04W 48/10 455/437 |
| 2015/0009841 A1* | 1/2015 | Lee | H04L 5/0073 370/252 |
| 2015/0120388 A1* | 4/2015 | Tan | G06F 3/016 705/7.32 |

FOREIGN PATENT DOCUMENTS

EP        2793406 A1    10/2014

OTHER PUBLICATIONS

R1-112110 3GPP TSG RAN WG1 Meeting #66, "Considerations on Interference Measurement and its Specification Impact in CoMP," Athens, Greece, Aug. 22-26, 2011, 4 pages.
(Continued)

*Primary Examiner* — Wei Zhao
(74) *Attorney, Agent, or Firm* — Slater Matsil, LLP

(57) ABSTRACT

An embodiment method includes identifying a plurality of VTP configurations representing allocations of TPs among a plurality of VTPs each having at least one TP. Potential serving VTPs are then identified for a selected UE in a plurality of UEs according to at least one UE centric criterion. The potential serving VTPs are selected for each of the plurality of VTP configurations. A UE measurement set is then scheduled for the potential serving VTPs for a scheduled channel resource according to measurement parameters. The method further includes selecting a serving VTP configuration from the plurality of VTP configurations according to UE measurement feedback from the selected UE.

28 Claims, 11 Drawing Sheets

(56) References Cited

OTHER PUBLICATIONS

R1-112959 3GPP TSG RAN WG1 Meeting #66bis, "Considerations on Reference Signal for Interference Measurement," Zhuhai, China, Oct. 10-14, 2011, 5 pages.
R1-113190 3GPP TSG RAN WG1 Meeting #66bis, "Consideration on interference measurement for CSI feedback," Zhuhai, China, Oct. 10-14, 2011, 4 pages.
R1-114076 3GPP TSG RAN WG1 Meeting #67, "Enhanced Interference Measurement Mechanism for Rel. 11," San Francisco, USA, Nov. 14-18, 2011, 5 pages.
R1-123363 3GPP TSG RAN WG1 Meeting #70, "Enhanced Interference Measurement Mechanisms for Rel-11," Qingdao, China, Aug. 13-17, 2012.

* cited by examiner

METHOD AND CONTROLLER FOR LOW-OVERHEAD USER EQUIPMENT MEASUREMENTS

TECHNICAL FIELD

The present invention relates generally to a system and method for low-overhead user equipment (UE) measurements and, in particular embodiments, to a controller and method for measuring channels between a UE and a plurality of transmit points.

BACKGROUND

A typical wireless network includes many transmit points (TPs) that span a coverage area and can be grouped into one or more coordinating sets referred to as virtual transmit points (VTPs). A VTP includes one or more TPs that coordinate according to a protocol, such as dynamic point selection (DPS) or joint transmission (JT). A TP, sometimes referred to as a cell, is any access point (AP), or sector thereof, for the network. Network communication is further divided into time and frequency resource blocks. The member TPs of each VTP in the network can vary according to demand. For a given resource block, there are one or more VTP configurations that specify the TP composition of each VTP. A VTP configuration is selected for the given resource block according to measurements of the channels among the various TPs and user equipments (UEs), where the measurements are made by the UEs and fed back to the network.

A UE is served by a VTP for a given resource block. The VTP that serves a given UE can vary with each resource block. The selection of a VTP to serve the given UE, as well as certain transmission parameters, can be made according to the measurements of the channels.

UE measurements are made based on a transmission of a pilot from a TP to the UE. The TP typically broadcasts the pilot toward multiple UEs that then make their measurements and report, or feed-back, the results to the network. UE measurements are typically made at an overhead cost, which includes the network and processing resources required to transmit pilots, make measurements, and transmit the measurements back to the network. The network, typically through a controller, or base station, aggregates the measurements, selects a VTP configuration, and respectively assigns a VTP to serve each UE. The controller weighs the measurements against the interference, overhead, and accuracy requirements for the network.

SUMMARY OF THE INVENTION

Embodiments of the present invention provide a method of selecting respective serving VTPs to serve a plurality of UEs and a wireless communication system controller for the same.

An embodiment method of selecting a configuration of serving VTPs to serve a plurality of UEs includes identifying a plurality of VTP configurations representing respective allocations of TPs among a plurality of VTPs. Each of the plurality of VTPs includes at least one TP. The method further includes, for each of the plurality of VTP configurations, identifying potential serving VTPs for a selected UE in the plurality of UEs according to at least one UE centric criterion. The potential serving VTPs are selected from among the plurality of VTPs for each of the plurality of VTP configurations. A UE measurement set is then scheduled for the potential serving VTPs for a scheduled channel resource according to measurement parameters. The method further includes selecting a serving VTP configuration from the plurality of VTP configurations according to UE measurement feedback. The UE measurement feedback is received from the selected UE.

A controller embodiment for a wireless communication system includes a memory, a transceiver, and a processor coupled to the memory and the transceiver. The wireless communication system includes TPs serving a region within which a plurality of UEs are disposed. The memory is configured to store a plurality of VTP configurations according to which the TPs are allocable into a plurality of VTPs. Each of the plurality of VTP configurations represents an allocation of the TPs. The transceiver is configured to transmit UE measurement instructions to the TPs and a selected UE in the plurality of UEs. The transceiver is also configured to receive UE measurement feedback from the plurality of TPs and the selected UE. The processor is configured to identify potential serving VTPs for the selected UE according to at least one UE centric criterion. The potential serving VTPs are identified for each of the plurality of VTP configurations. The processor is also configured to schedule a UE measurement set for the potential serving VTPs for a scheduled channel resource according to measurement parameters. The processor is further configured to generate and cause the transceiver to transmit the UE measurement instructions according to the UE measurement set. The processor is further configured to select a serving VTP configuration from the plurality of VTP configurations according to UE measurement feedback received from the selected UE by the transceiver.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, the present invention provides many applications and inventive concepts that may be embodied in a wide variety of specific contexts. The specific embodiments discussed herein are merely illustrative of specific ways to make and use the invention, and do not limit the scope of the invention.

It is realized herein the overhead used for UE measurements can be reduced with certain measurement techniques that can eliminate redundancies and sacrifice some accuracy when appropriate. It is realized herein that each UE in a wireless communication system generally receives strong power from a limited number of TPs, which are potential serving TPs or strong interferers. The UE measurements are focused on those TPs. Any power received from other TPs is generally insignificant relevant to that received from the strong TPs. It is realized herein the interference from the other TPs can be measured, by the UE, in the aggregate to approximate a sum interference. It is also realized herein that accurate UE measurements are more important when the UE is on or near the edge of a cell. When a UE is generally centered in a cell, the selection of a VTP configuration, VTP, and ultimately a TP to serve the UE is simplified, because of the relatively high power received from the TP centered in the cell. Additionally, it is realized herein, the rate at which sum interference is measured can be less than the rate at which strong TPs are measured by a given UE. It is further realized herein the selection of an update rate for these measurements in the time and frequency domain can be made according to the rate at which the corresponding VTP configuration is selected.

Figure 1:
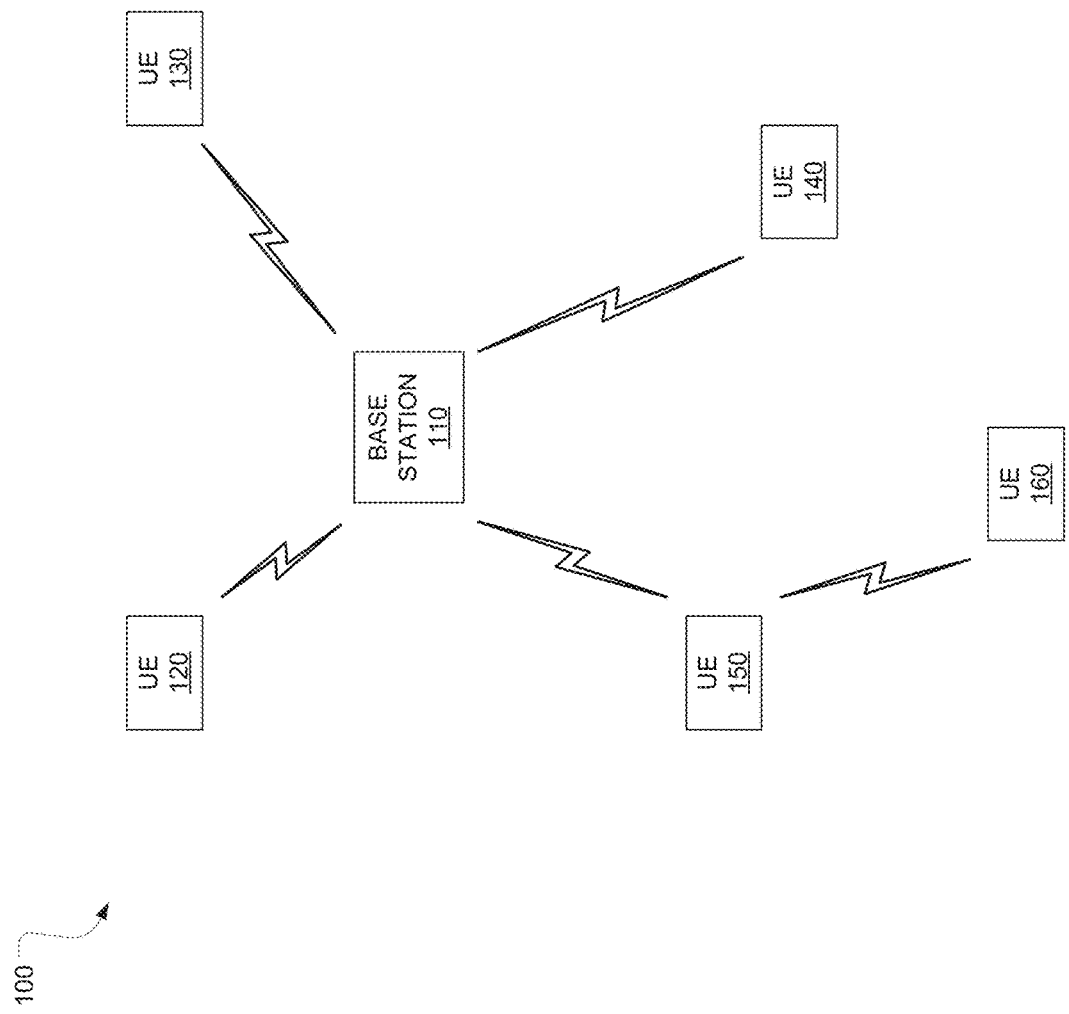
FIG. 1 is a block diagram of one embodiment of a wireless communication system.

FIG. 1 is a block diagram of one embodiment of a wireless communication system 100. Wireless communication system 100 includes a base station 110 that serves one or more UEs, such as UE 120, UE 130, UE 140, and UE 150, by receiving communications originating from the UEs and forwarding the communications to their respective intended destinations, or by receiving communications destined for the UEs and forwarding the communications to their respective intended UEs. Some UEs can communicate directly with one another as opposed to communicating through base station 110. For example, in the embodiment of FIG. 1, a UE 160 transmits directly to UE 150, and vice versa. Base station 110 is sometimes referred to as an access point, a NodeB, an evolved NodeB (eNB), a controller, or a communication controller. UEs 120 through 160 are sometimes referred to as stations, mobile stations, mobiles, terminals, users, or subscribers.

Figure 2:
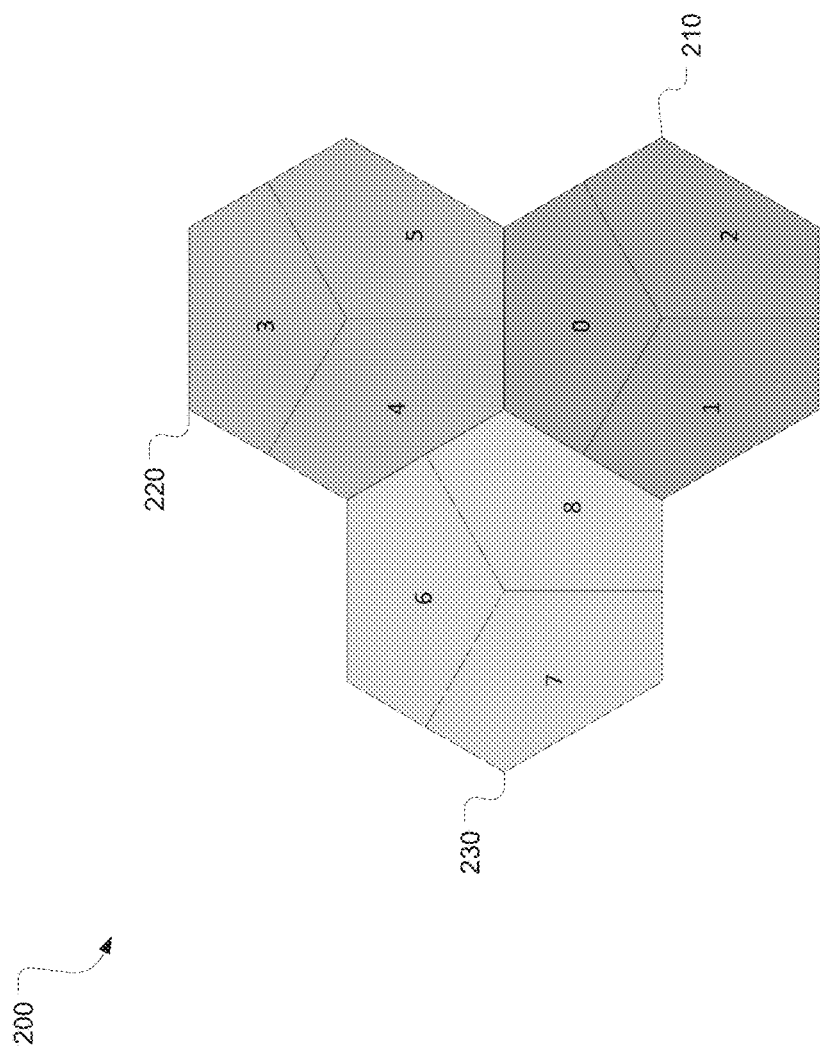
FIG. 2 is an illustrative diagram of one embodiment of a wireless network.

FIG. 2 is an illustrative diagram of one embodiment of a wireless network 200. Wireless network 200 includes nine cells, or TPs, divided into three VTPs: VTP 210, VTP 220, and VTP 230. VTP 210 includes cells 0, 1, and 2; VTP 220 includes cells 3, 4, and 5; and VTP 230 includes cells 6, 7, and 8. The allocation of the nine cells into the three VTPs is done by a controller for wireless network 200. Alternative embodiments can include any number of cells. Furthermore, alternative embodiments can divide those cells among any number, one or more, of VTPs. When a UE is to be served by wireless network 200, it is served by the TPs in one of the three VTPs. While being served by one of the VTPs, any signals or noise received by the UE from any VTP not serving the UE is considered interference. For example, in the embodiment of FIG. 2, when a UE is being served by VTP 220, any signal or noise received by the UE from TPs 0, 1, or 2 in VTP 210, or from TPs 6, 7, or 8 in VTP 230 is considered interference.

The selection of a VTP and the TPs within to serve a UE is made according to measurements of the various channels between the UE and the TPs. These measurements are made by the UE, along with any other UEs to be served by wireless network 200. To measure a channel between a given TP and the UE, the UE observes transmissions among the various TPs and UEs. Certain measurements are made using known transmissions, or pilots, from the TPs. For example, consider the UE to be served by VTP 220. The UE measures the respective channels between it and TPs 3, 4, and 5, as well as any interference from VTPs 210 and 230. One way to measure the channel between TP 3 and the UE is to instruct TPs 4 and 5 to mute, or to not transmit, and instruct TP 3 to transmit a pilot. The respective channels between TPs 4 and 5 and the UE are similarly measured, utilizing three transmissions, or resource units. A resource unit, sometimes referred to as a resource element, is the smallest division of time and frequency resources allocated for a given wireless communication system. To measure the interference from VTPs 210 and 230, TPs 3, 4, and 5 are instructed to mute and the UE listens for any power that leaks from the TPs of VTPs 210 and 230 into the channels for VTP 220. The interference measurement is effectively an aggregate of all interference originating outside VTP 220. The interference measurement utilizes one transmission, or resource unit.

Figure 3:
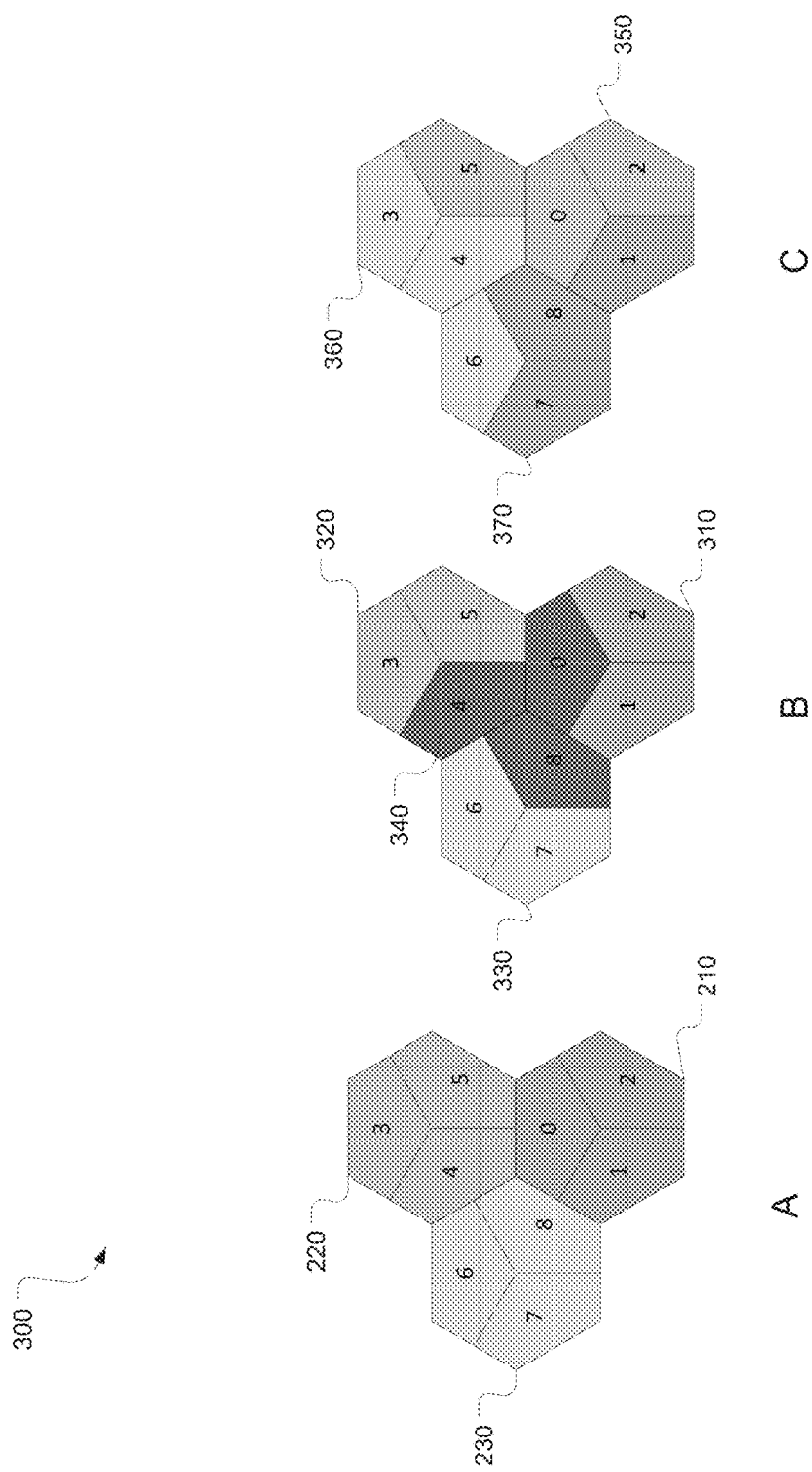
FIG. 3 is an illustrative diagram of an embodiment of a multi-VTP configuration wireless network.

FIG. 3 is an illustrative diagram of one embodiment of a multi-VTP configuration wireless network 300. Wireless network 300 includes nine cells divided into at least one VTP. Wireless network 300 includes three VTP configurations, VTP configuration A, VTP configuration B, and VTP configuration C. Each of the three VTP configurations specifies a different division, or allocation, of the nine cells among the one or more VTPs. Alternative embodiments can include any number of VTP configurations. VTP configuration A includes the three VTPs of the embodiment wireless network of FIG. 2, VTP 210, VTP 220, and VTP 230. VTP configuration B includes four VTPs: VTP 310, VTP 320, VTP 330, and VTP 340. VTP 310 includes cells 1 and 2. VTP 320 includes cells 3 and 5. VTP 330 includes cells 6 and 7. VTP 340 includes cells 0, 4, and 8. VTP configuration C includes three VTPs: VTP 350, VTP 360, and VTP 370. VTP 350 includes cells 0, 2, and 5. VTP 360 includes cells 3, 4, and 6. VTP 370 includes cells 7, 8, and 1.

For a given UE to be served by wireless network 300, the UE needs measurements for the respective channels between it and the TPs within the VTP that will serve it, for each VTP configuration. The selection of VTPs within a given VTP configuration to serve the UE is made according to at least one UE centric criterion. UE centric criteria include the location of UEs, UE quality of service (QoS), and UE quality of experience (QoE). UE centric criteria allow the selection of potential serving VTPs to be optimized for each UE or group of UEs. The UE measurements are then used, along with measurements made by any other UEs to be served by wireless network 300, to select a VTP configuration to be employed for a given resource block. For example, a UE in the proximity of cell 5 may be served by VTP 220 in VTP configuration A, by VTP 320 in VTP configuration B, or by VTP 350 in VTP configuration C.

UE measurements are made with a certain amount of accuracy and at a cost of a certain amount of overhead. The balance of overhead versus accuracy is adjustable through several techniques. The overhead cost of a UE measurement is represented as resource units per resource block per cell. Variance in the overhead cost is found among the various mutes and pilot transmissions used to make the UE measurements, each of which consumes resource units. Additionally, the overhead required for a measurement is scaled by a parameter, k, according to the number of antennas and various other parameters for a given TP. The parameter k is the number of resource units used to properly estimate a channel and represents a trade-off between the accuracy of a particular measurement for one port of a TP and the overhead for the one port. In certain embodiments, for a given VTP configuration, a baseline UE measurement includes one TP transmitting a pilot and all others muting, consuming 1k resource units per resource block per cell. The measurement is repeated by the UE for each strong-powered TP. The baseline UE measurements also include a sum interference measurement made by muting all strong-powered TPs and instructing all other TPs to transmit a pilot. The UE measures the aggregate power of all weak-powered TPs.

For example, for VTP configuration A of FIG. 3, UE measurements for VTP 210, VTP 220, and VTP 230 have an overhead cost of (3+1)k resource units per resource block per cell. To arrive at this overhead cost, consider a single cell, for example cell 3 of VTP 220. A channel between the UE and the TP 3 is measured along with two others between UE and TP 4 and TP 5. TP 3 is measured by muting TP 4 and TP 5, and transmitting a pilot from TP 3. Likewise, TP 4 is measured by muting TP 3 and TP 5, and transmitting a pilot from TP 4; and TP 5 is measured by muting TP 3 and TP 4, and transmitting a pilot from TP 5. That amounts to one pilot transmission and two mutes per cell, giving the 3k resource units per resource block per cell. Each of TPs 3, 4, and 5 are then muted while TPs 0, 1, 2, 6, 7, and 8 transmit a pilot, allowing the UE to measure the sum interference from those TPs. That amounts to one mute per cell, giving the +1k resource units per resource block per cell. Each of VTP 210, VTP 220, and VTP 230 has three cells, so the total overhead cost of UE measurements for VTP configuration A is nine cells times (3+1)k resource units per resource block. The average overhead cost of UE measurements for VTP configuration A is also (3+1)k resource units per resource block.

Now consider VTP configuration B of FIG. 3. VTP 310 consumes (2+1)k resource units per resource block per cell, as do VTP 320 and VTP 330. VTP 340, which has three cells, consumes (3+1)k resource units per resource block per cell. The total overhead cost of UE measurements for VTP configuration B is six cells times (2+1)k resource units per resource block plus three cells times (3+1)k resource units per resource block. The average overhead cost of UE measurements for VTP configuration B is (2.33+1)k resource unit per resource block per cell.

The overhead costs for baseline UE measurements for VTP configuration C are similar to the costs for VTP configuration A, because, although VTP 350, VTP 360, and VTP 370 are distinct from VTP 210, VTP 220, and VTP 230, each contains three cells. Accordingly, the average overhead cost for baseline UE measurements for VTP configuration C is (3+1)k resource units per resource block per cell.

Certain embodiments use similarities among the various VTP configurations to reduce the overhead cost of UE measurements. When a VTP in a second VTP configuration is a subset of another VTP in a first VTP configuration, the measurements for the first VTP configuration can be used for the second VTP configuration. For example, in the embodiment of FIG. 3, VTP 310 of VTP configuration B is a subset of VTP 210 of VTP configuration A. UE measurements made for cells 1 and 2 for VTP configuration A can be reused for VTP configuration B. Additionally, the UE measurement made for cell 0 in VTP configuration A can be combined with the sum interference measurement for VTP configuration A and reused as a sum interference measurement for VTP configuration B. UE measurements for VTP configuration A would still have an average overhead cost of (3+1)k resource units per resource block per cell, which is the baseline overhead cost. For VTP configuration B, VTP 310, VTP 320, and VTP 330 are respective subsets of VTP 210, VTP 220, and VTP 230, and have no overhead cost for reusing UE measurements from VTP configuration A. VTP 340 is not a subset of any VTP from VTP configuration A and therefore has an overhead cost of (3+1)k resource units per resource block per cell. The average overhead cost for UE measurements for VTP configuration B are then (1+0.33)k resource units per resource block per cell. VTP configuration C has no VTPs that are subsets of any VTPs in VTP configuration B, therefore no reductions in overhead are achieved by any similarities between those VTP configurations. The average overhead cost for UE measurements for VTP configuration C are (3+1)k resource units per resource block per cell.

Figure 4:
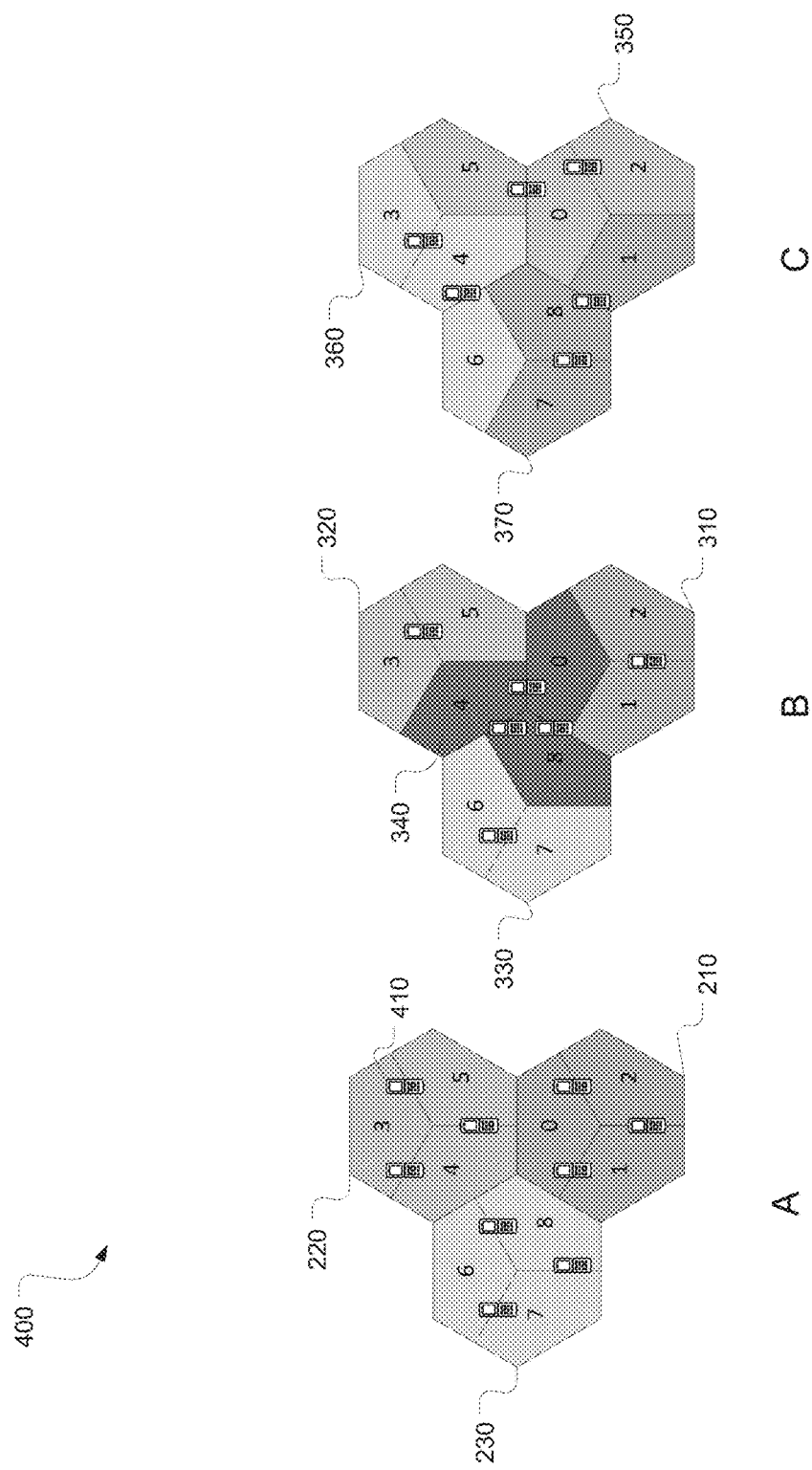
FIG. 4 is another illustrative diagram of the multi-VTP configuration wireless network embodiment of FIG. 3 with cell-edge UEs.

In certain embodiments, measurements are focused on cell-edge UEs. Cell-edge UEs are those that are scheduled to be located on or near boundaries between cells within a given VTP. FIG. 4 is an illustrative diagram of the multi-VTP configuration wireless network embodiment of FIG. 3 with various cell-edge UEs 410. In VTP configuration A, VTP 210 has cell-edge UEs at the boundaries between cell 0 and cell 2, between cell 0 and cell 1, and between cell 1 and cell 2. VTP 220 has cell-edge UEs at the boundaries between cell 3 and cell 5, between cell 3 and cell 4, and between cell 4 and cell 5. VTP 230 has cell-edge UEs at boundaries between cell 6 and cell 8, between cell 6 and cell 7, and between cell 7 and cell 8. In VTP configuration B, VTP 310 has a cell-edge UE at the boundary of cell 1 and cell 2. VTP 320 has a cell-edge UE at the boundary of cell 3 and cell 5. VTP 330 has a cell-edge UE at the boundary of cell 6 and cell 7. VTP 340 has cell-edge UEs at the boundaries between cell 0 and cell 4, between cell 0 and cell 8, and between cell 4 and cell 8. In VTP configuration C, VTP 350 has cell-edge UEs at boundaries between cell 0 and cell 2 and between cell 0 and cell 5. VTP 360 has cell-edge UEs at boundaries between cell 3 and cell 4 and between cell 4 and cell 6. VTP 370 has cell-edge UEs at boundaries between cell 7 and cell 8 and between cell 1 and cell 8.

For VTP configuration C, the overhead cost of UE measurements can be reduced by only carrying out UE measurements for TPs on either side of the cell-edge. For example, for VTP 350, the cell-edge UE at the boundary between cell 0 and cell 2 can make UE measurements for cell 0 and cell 2, and can ignore any interference from cell 5. Likewise, for the cell-edge UE at the boundary between cell 0 and cell 5, UE measurements can be made for cell 0 and cell 5, and any interference from cell 2 can be ignored. The overhead cost for UE measurements for VTP configuration C are then six times (2+1)k resource units per resource block. The average overhead cost for UE measurements is (1.33+0.66)k resource units per resource block per cell.

In certain embodiments, the frequency at which certain TPs are measured is set according to their respective significance to the measuring UE. For example, strong TPs that are more likely to serve the measuring UE are measured more frequently than those that are weak. The overhead cost of UE measurements for the weaker TPs can be reduced by making the sum interference measurements less frequently. For example, in FIG. 4, UE 410 on the boundary between cell 3 and cell 5 in VTP configuration A is more likely to be served by VTP 220 than VTP 210 or VTP 230. That UE, as well as other UEs in that proximity, could make UE measurements for cells within VTP 220 more frequently than for cells within VTP 210 or VTP 230. The average overhead cost for baseline UE measurements for VTP 220 are (3+1)k resource units per resource block per cell. The reduced measurement rate impacts the +1k resource units per resource block per cell allocated for sum interference measurements. The reduction is represented as a scalar, α, applied to the +1k resource units per resource block per cell, where α<1.

In multi-VTP configuration wireless networks, occasionally certain VTP configurations are selected more frequently than others. In certain embodiments, the respective rate, in the time or frequency domain, at which UE measurements are carried out for various VTP configurations varies according to how frequently those VTP configurations are selected. For example, in the embodiment of FIG. 4, VTP configuration A may be selected 90% of the time, while VTP configuration B and VTP configuration C are each selected around 5% of the time. In that case, the frequency at which VTP configuration B and VTP configuration C are measured can be reduced. In some embodiments, the frequency reduction can be a function of the fraction of times one VTP configuration is selected normalized to the most selected VTP configuration. Continuing the example above, if VTP configuration B is selected 5% of the time and VTP configuration A 90%, the frequency could be reduced by 0.05/0.9. The reduced overhead cost of UE measurements due to the frequency reduction is represented as a scalar applied to average overhead cost for a given VTP configuration. VTP configuration C has an average overhead cost of (3+1)k resource units per resource block per cell for baseline UE measurements. The average overhead cost with a reduction in the frequency at which VTP configuration C is measured is 0.05/0.9·(3+1)k resource units per resource block per cell.

Figure 5:
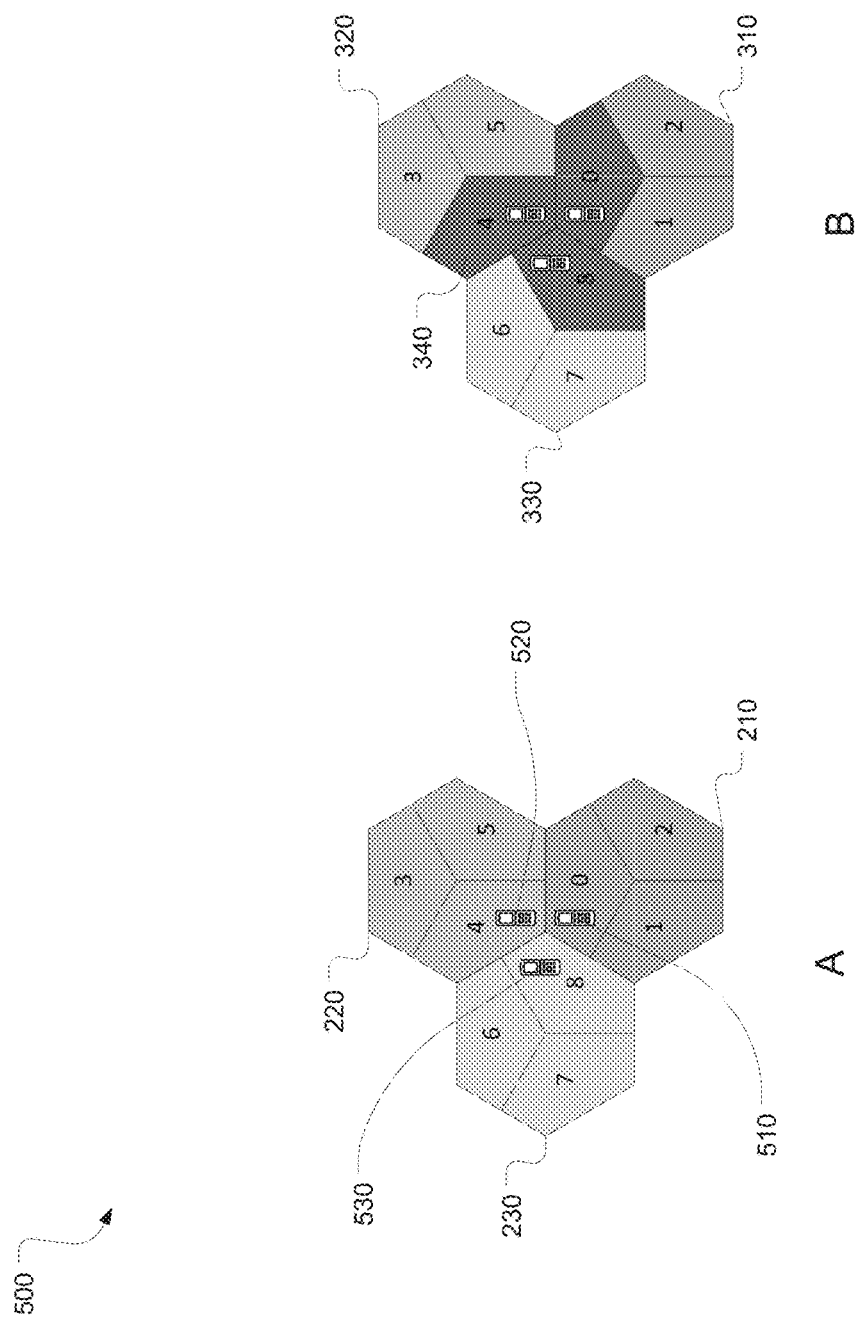
FIG. 5 is yet another illustrative diagram of the multi-VTP configuration wireless network embodiment of FIG. 3.

FIG. 5 is another illustrative diagram of the multi-VTP configuration wireless network embodiment of FIG. 3 and FIG. 4. Wireless network 500 includes a VTP configuration A and a VTP configuration B. VTP configuration A includes VTP 210, VTP 220, and VTP 230 of FIGS. 2, 3, and 4. VTP configuration B includes VTP 310, VTP 320, VTP 330, and VTP 340 of FIGS. 3 and 4. Wireless network 500 is serving three groups of UEs, UEs 510, UEs 520, and UEs 530. A group of UEs is one or more UEs. UEs 510 are located in cell 0, UEs 520 are located in cell 4, and UEs 530 are located in cell 8.

In certain embodiments, overheard pilots from one VTP configuration can be used in another VTP configuration to improve accuracy or to reduce overhead. For example, in the embodiment of FIG. 5, UEs 510 in cell 0 would be scheduled to make UE measurements for VTP 210 in VTP configuration A. In addition to receiving pilots from the TPs for cells 0, 1, and 2, UEs 510 can also overhear pilots transmitted from cell 4 and cell 8 when measurements are made for VTP configuration A. Similarly, UEs 520 can overhear pilots from cell 0 and cell 8, and UEs 530 can overhear pilots from cell 4 and cell 0. These overheard pilots can be used for UE measurements for VTP 340 of VTP configuration B. UE measurements can use the overheard pilots in a variety of ways, generally to increase the accuracy of UE measurements for VTP configuration B or to reduce the rate, in the time or frequency domain, of UE measurements for VTP configuration B. Overheard pilots can increase accuracy of VTP configuration B UE measurements by providing additional data points for the baseline UE measurements. Accordingly, the UE measurement rate can be adjusted to achieve the desired balance of accuracy and overhead cost for UE measurements. Gains in accuracy due to the overheard pilots can be offset by reducing the UE measurement rate in either frequency or time domain, or in both.

Figure 6:
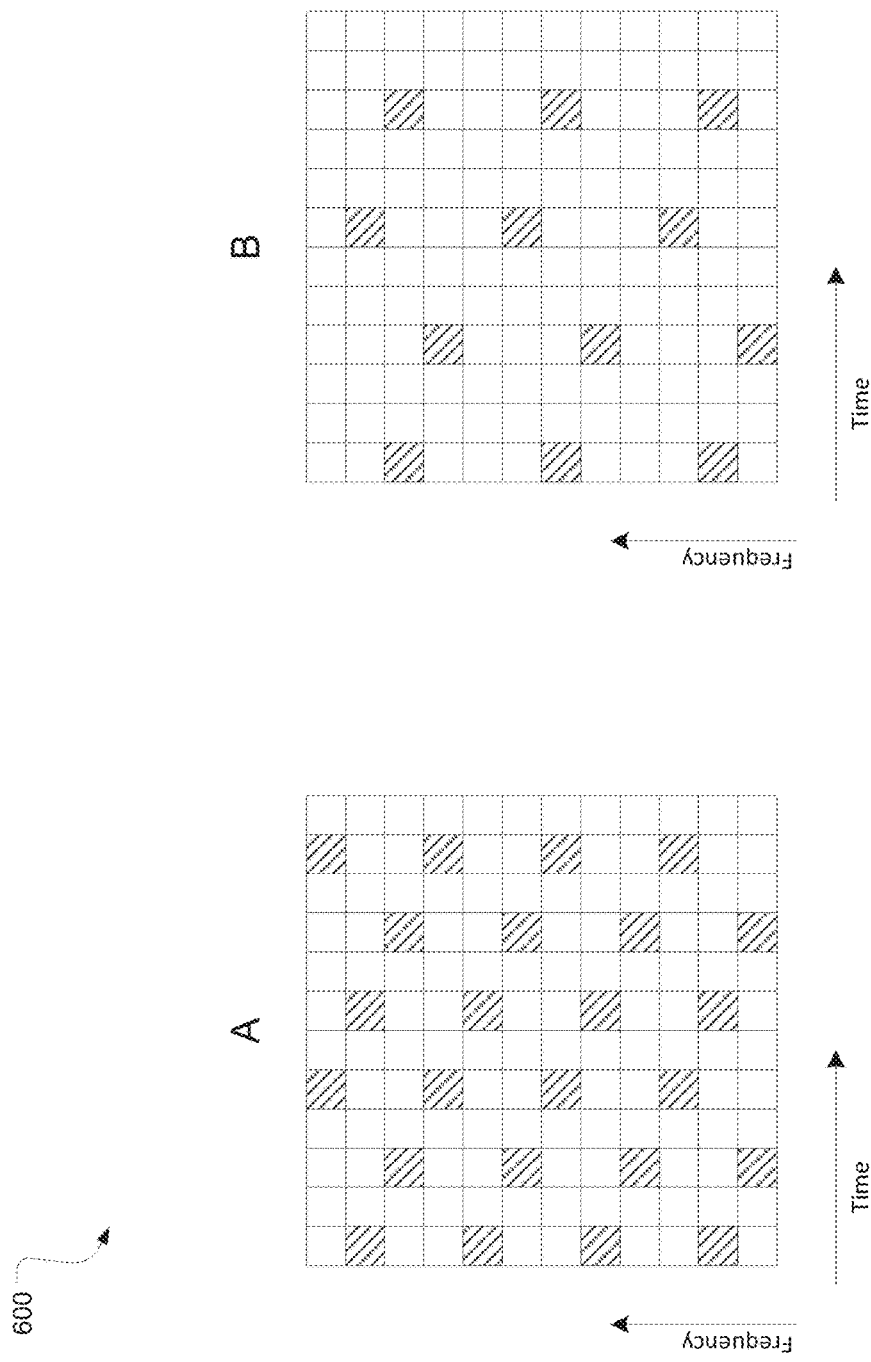
FIG. 6 is an illustrative diagram of one embodiment of a resource unit grid.

FIG. 6 is an illustration of one embodiment of a resource unit grid 600. Resource unit grid 600 is two dimensional, having a time axis running horizontally, and a frequency axis running vertically. A resource allocation of one resource unit for a UE measurement is designated by a pattern-filled square in resource unit grid 600. In resource unit grid 600-A, UE measurements are densely allocated among the resource units. In resource unit grid 600-B, UE measurements are less densely allocated among the resource units, relative to resource unit grid 600-A.

In certain embodiments, when one VTP configuration is selected more or less frequently than another, the density of resource allocations for UE measurements for a given VTP configuration can be adjusted according to how frequently the given VTP configuration is selected. For example, in the embodiment of FIG. 6, resource unit grid 600-A illustrates a possible resource allocation, and resource unit grid 600-B illustrates another. Resource allocations may also be referred to as pilot/mute pattern densities. Resource unit grid 600-A may represent a VTP configuration A, and resource unit grid 600-B may represent a VTP configuration B. The density of resource allocations in resource unit grid 600-A relative to resource unit grid 600-B suggests that VTP configuration A is selected more frequently than VTP configuration B. In the time domain, one of every two resource units is allocated for UE measurements for VTP configuration A. One of every three resource units is allocated for UE measurements for VTP configuration B. In the frequency domain, one of every three resource units is allocated for UE measurements for VTP configuration A, while one of every four resource units is allocated for UE measurements for VTP configuration B.

Figure 7:
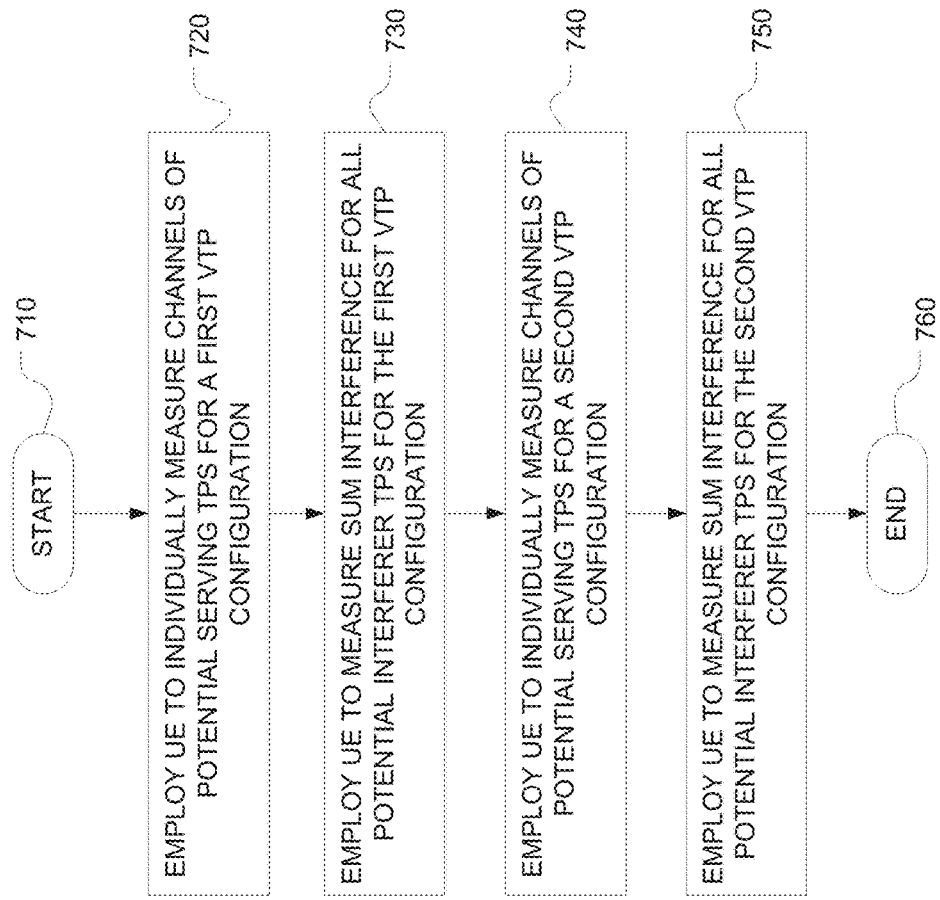
FIG. 7 is a flow diagram of one embodiment of a method of measuring channels between a UE and a plurality of TPs.

FIG. 7 is a flow diagram of one embodiment of a method of measuring channels between a UE and a plurality of TPs. The method begins at a start step 710. At a first individual measurement step 720, at least one UE is employed to measure the channels of potential serving TPs for a first VTP configuration. A UE typically receives strong power from several TPs, which are the potential serving TPs. All other TPs are potential interferers. Measuring the channels for one potential serving TP in the first VTP configuration generally includes instructing the one potential serving TP to transmit a pilot and instructing the other potential serving TPs in the first VTP configuration to mute, or transmit nothing. This is then repeated for each potential serving TP in the first VTP configuration.

At a first sum interference measurement step 730, the one or more UEs are employed to measure sum interference for the potential interferer TPs for the first VTP configuration. A UE generally receives insignificant amounts of power from the respective potential interferer TPs. The sum interference measurement aggregates all interference into a single interference measurement. The sum interference measurement is made by instructing all potential serving TPs in the first VTP configuration to mute, allowing the UE to measure the aggregate power received from the potential interferer TPs.

The UE measurements are then repeated for a second VTP configuration. At a second individual measurement step 740, the at least one UE is employed to measure the channels of potential serving TPs for the second VTP configuration. At a second sum interference measurement step 750, the at least one UEs are employed to measure the sum interference for the potential interferer TPs for the second VTP configuration. The method then ends at an end step 760.

Figure 8:
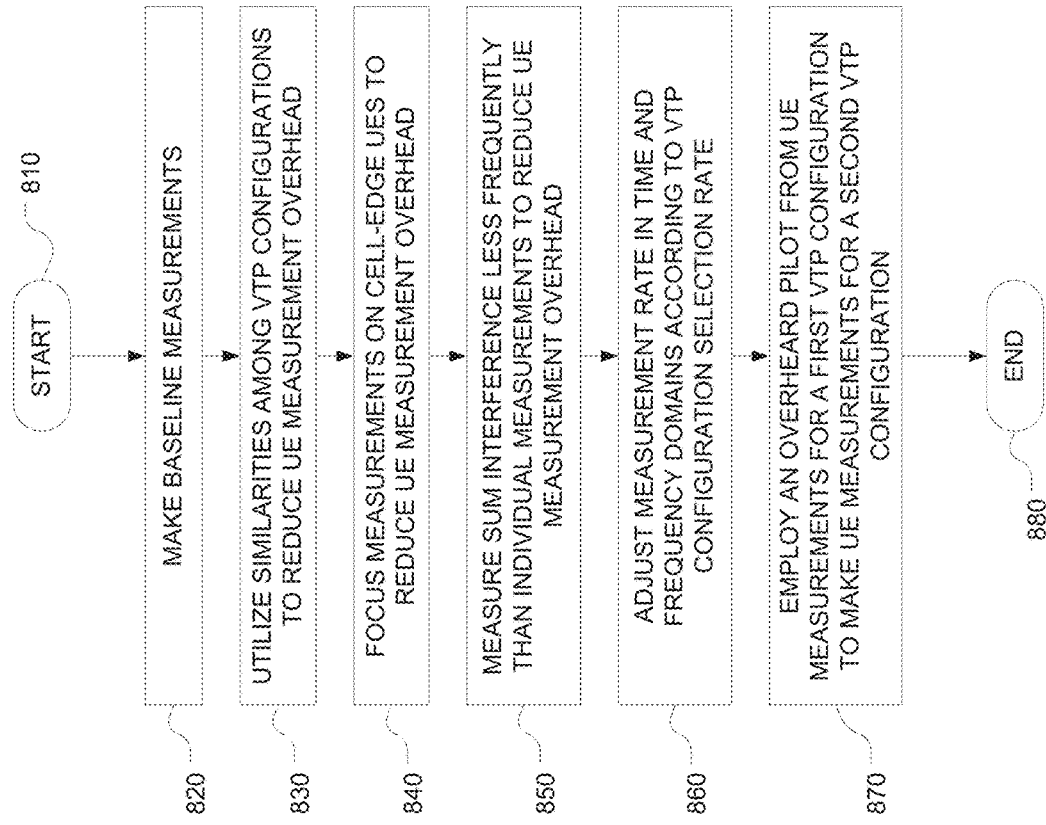
FIG. 8 is a flow diagram of another embodiment of a method of measuring channels between a UE and a plurality of TPs.

FIG. 8 is a flow diagram of another embodiment of a method of measuring channels between a UE and a plurality of TPs. The plurality of TPs is divided into one or more VTPs. The allocation of TPs to VTPs can be done in a variety of ways, each different allocation is a different VTP configuration. The method begins at a start step 810. At a baseline step 820, baseline UE measurements are made by a UE for a first VTP configuration. Baseline UE measurements provide a baseline level of accuracy at a baseline overhead cost. At a step 830, the overhead cost of UE measurements can be reduced relative to the baseline overhead. At step 830, similarities between the first VTP configuration and a second VTP configuration are used to reduce the UE measurements needed for the second VTP configuration. For VTPs in the second VTP configuration that are subsets of a VTP in the first VTP configuration, UE measurements for the first VTP configuration can be used for the second VTP configuration. In alternative embodiments, step 830 is omitted in favor of another technique for balancing accuracy and overhead.

At a step 840, UE measurements are focused on cell-edge UEs to reduce UE measurement overhead. By reducing the UE measurements for non-cell-edge UEs, the accuracy of the UE measurements is reduced. In alternative embodiments, step 840 can be omitted in favor of another technique for balancing accuracy and overhead. Focusing on cell-edge UEs can be used in combination with baseline UE measurements and the technique of step 830.

At a step 850, UE measurement overhead is reduced by reducing the rate at which a given UE measures less significant TPs, particularly those that are potential interferers, which are measured via a sum interference measurement. The reduced UE measurement rate also reduces accuracy of those measurements; however, the accuracy is more significant for potential serving TPs. The UE measurement rate for sum interference measurements is set according to the desired accuracy for sum interference measurements and according to the acceptable overhead cost for those UE measurements. Alternative embodiments may omit step 850 in favor of another technique for balancing accuracy and overhead.

At a step 860, the rate at which UE measurements are made is adjusted, in the time domain, the frequency domain, or in both, according to the selection rate for a given VTP configuration. VTP configurations that are selected more frequently are measured more frequently, while VTP configurations that are selected less frequently are measured less frequently. For a VTP configuration that is selected more frequently, the pilot/mute pattern density in the frequency domain or the pilot/mute pattern density in the time domain can be increased to increase the accuracy of UE measurements for that VTP configuration. An increased time domain or frequency domain pilot/mute pattern density causes an increase in overhead cost. For a VTP configuration selected less frequently, the pilot/mute pattern density in the frequency domain or the pilot/mute pattern density in the time domain can be reduced to reduce the overhead of those UE measurements. Additionally, the reduced pilot/mute pattern density causes a reduced accuracy for the UE measurements. The precise ratio of UE measurement rates is set according to the accuracy and overhead requirements for the wireless network. In alternative embodiments, step 860 can be omitted in favor of another technique for balancing accuracy and overhead.

At a step 870, pilots overheard while measuring the first VTP configuration are used for measurements for the second VTP configuration. The overheard pilots can be used to increase the accuracy of measurements in for the second VTP configuration. The overheard pilots also allow for a reduced measurement rate for the second VTP configuration, thereby reducing the overhead for UE measurements for the second VTP configuration. Alternative embodiments may omit step 870 in favor of other techniques for balancing accuracy and overhead. The method then ends at an end step 880.

Figure 9:
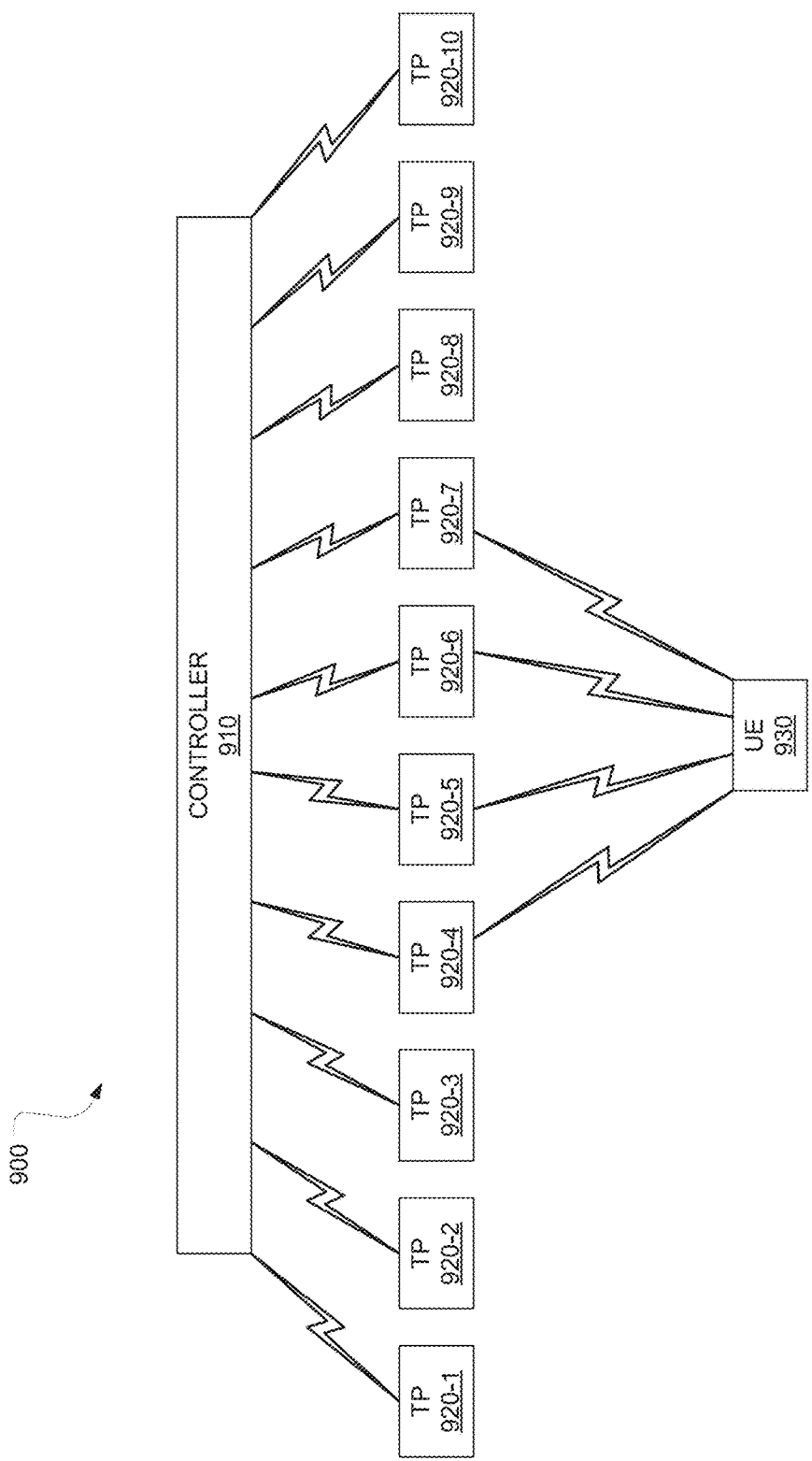
FIG. 9 is a block diagram of one embodiment of a wireless communication system.

FIG. 9 is a block diagram of one embodiment of a wireless communication system 900. Wireless communication system 900 includes a controller 910, a plurality of TPs 920-1 through 920-10, and a UE 930. TPs 920-1 through 920-10 cover a region within which UE 930 is disposed. TPs 920-1 through 920-10 can be partitioned into one or more VTPs. The partitioning is carried out by controller 910 according to one or more VTP configurations. Controller 910 selects a VTP configuration for partitioning TPs 920-1 through 920-10 into VTPs according to measurements made by UE 930, among a variety of other possible parameters. UE 930 is configured to make UE measurements for channels between it and TPs 920-1 through 920-10.

To make UE measurements, controller 910 instructs each of TPs 920-1 through 920-10 to either transmit a pilot or mute. Controller 910 also instructs UE 930 as to which of TPs 920-1 through 920-10 are transmitting a pilot and which are muting. Transmitting TPs broadcast a pilot for UE 930 to receive and use to measure the channel between UE 930 and that TP. To measure one channel, controller 910 instructs one potential serving TP to transmit a pilot and instructs all other potential serving TPs to mute. Potential serving TPs are those from which UE 930 receives strong power, which are typically the nearest TPs. In the embodiment of FIG. 9, the potential serving TPs are TP 920-4, TP 920-5, TP 920-6, and TP 920-7. This procedure is then repeated for each of the potential serving TPs. To measure interference, controller 910 instructs all potential serving TPs to mute and all potential interferer TPs to transmit. The potential interferer TPs in the embodiment of FIG. 9 are TP 920-1, TP 920-2, and TP 920-3, and TP 920-8, TP 920-9, and TP 920-10. UE 930 then makes a sum interference measurement that represents an aggregate signal from all potential interferer TPs.

Figure 10:
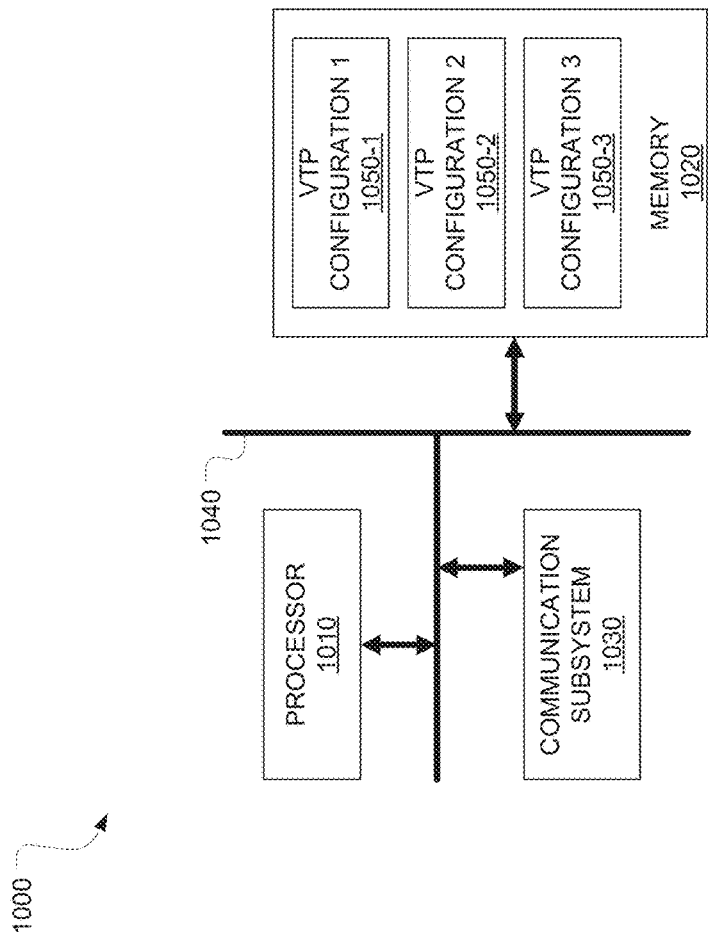
FIG. 10 is a block diagram of one embodiment of a controller for a wireless communication system.

FIG. 10 is a block diagram of one embodiment of a controller 1000 for a wireless communication system. Controller 1000 includes a processor 1010, a memory 1020, and a transceiver 1030, all coupled to a data bus 1040. Processor 1010 is configured to access memory 1020 through data bus 1040, allowing it to cause data to be written and read from memory 1020. Processor 1010 is further configured to cause data to be transmitted and received through transceiver 1030. Transceiver 1030 serves as an interface to a wireless communication network, which can include one or more TP and one or more UE. Transceiver 1030, in certain embodiments, can include its own dedicated memory and processor for implementing various communication protocols, as well as a network interface. The network interface includes a physical connection or wireless connection via one or more antenna.

Memory 1020 is configured to store at least one VTP configuration according to a VTP configuration data structure. In the embodiment of FIG. 10, memory 1020 is configured to store three VTP configurations: a VTP configuration 1 1050-1, a VTP configuration 2 1050-2, and a VTP configuration 3 1050-3. Each VTP configuration describes a partition of the various TPs in the wireless communication system into one or more VTP. Processor 1010 is configured to make the partitions for the various VTP configurations and cause them to be written to memory 1020 according to the VTP configuration data structure. The number of TPs in a given VTP can vary per VTP. The number of VTPs in a VTP configuration can vary per VTP configuration. The number of VTP configuration created for a given wireless communication system can vary per system and per resource block.

Processor 1010 is tasked with selecting a VTP configuration to serve the active UEs in the wireless communication system for each resource block. The VTP configuration chosen can vary per resource block. The VTP configuration selection is made according to a variety of parameters, including UE measurements made for the respective channels between the UEs and the various TPs that make up wireless communication system. Processor 1010 schedules the UE measurements for each resource block. Processor 1010 causes transceiver 1030 to transmit various instructions to the TPs and the UEs. Instructions to the TPs are typically to either transmit a pilot or to mute. The pilot is a sequence used for estimating channels and is unique to a given UE. Each UE can have one or more unique pilots. Instructions to the UEs inform the UEs of when pilots are scheduled to be transmitted, allowing the UEs to make the relevant UE measurements. The UEs receive the pilots and measure their respective channels, defined in the frequency and time domains. The UEs then transmit the measurements back to controller 1000. Processor 1010 receives the UE measurements for a given resource block through transceiver 1030.

Figure 11:
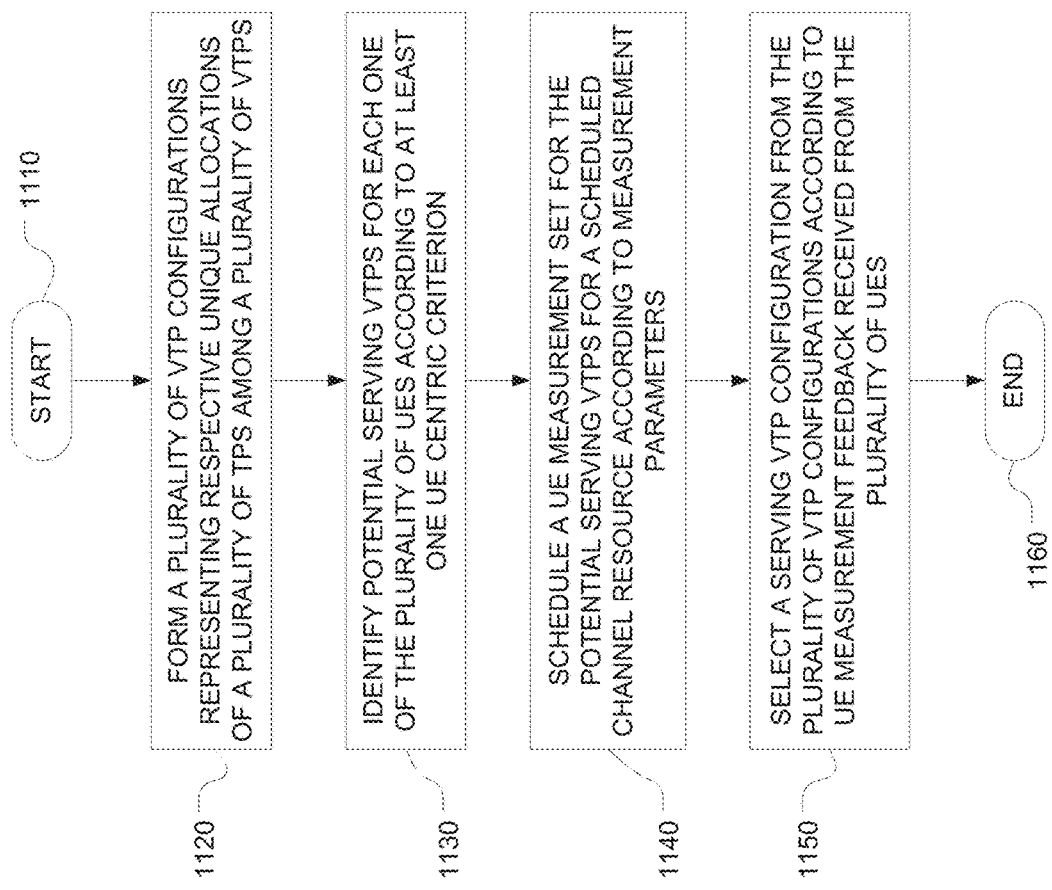
FIG. 11 is a flow diagram of one embodiment of a method of selecting respective serving VTPs to serve a plurality of UEs.

FIG. 11 is a flow diagram of one embodiment of a method of selecting respective serving VTPs to serve a plurality of UEs. The method begins at a start step 1110. At a forming step 1120, a controller forms a plurality of VTP configurations. Each of the plurality of VTP configurations represents an allocation of TPs among a plurality of VTPs. Each of the plurality of VTPs includes at least one TP. At an identifying step 1130, potential serving VTPs for each of the plurality of UEs are identified according to at least one UE centric criterion. The potential serving VTPs are selected from among the plurality of VTPs for each of the plurality of VTP configurations. UE centric criterion can include UE location, UE QoS, and UE QoE, among others.

A UE measurement set is scheduled for a scheduled channel resource at a scheduling step 1140. The UE measurement set is scheduled according to measurement parameters. Measurement parameters can include similarities among the plurality of VTP configurations, the importance of each of the UEs, the importance of each of the plurality of VTP configurations, and the relative power received from potential interferer TPs.

The UE measurement set is communicated to the plurality of UEs as UE measurement instructions. The plurality of UEs carry out the UE measurement set and provide UE measurement feedback to the controller. At a selection step 1150, the controller selects a serving VTP configuration from the plurality of VTP configurations according to the UE measurement feedback. By selecting the serving VTP configuration, the controller also selects the potential serving VTPs for the serving VTP configuration as the respective serving VTPs for the plurality of UEs. The method then ends at an end step 1160.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of selecting a configuration of serving wireless virtual transmit points (VTPs) to serve a plurality of user equipments (UEs), comprising:
   identifying a plurality of wireless VTP configurations,
      wherein each wireless VTP configuration represents an allocation of wireless transmit points (TPs) among a plurality of wireless VTPs, and
      wherein each wireless VTP comprises at least one wireless TP;
   for each of the plurality of wireless VTP configurations, identifying potential serving wireless VTPs for a selected UE in the plurality of UEs according to at least one UE centric criterion;
   scheduling a UE wireless channel measurement set for the potential serving wireless VTPs for a scheduled wireless channel resource according to measurement parameters, wherein the measurement parameters include respective importance of the plurality of wireless VTP configurations, and wherein the respective importance is set according to how frequently each one of the plurality of wireless VTP configurations is selected as the serving wireless VTP configuration; and
   selecting a serving wireless VTP configuration from the plurality of wireless VTP configurations in accordance with UE wireless channel measurement feedback received from the selected UE.

2. The method of claim 1 wherein the at least one UE centric criterion includes UE location.

3. The method of claim 1 wherein the at least one UE centric criterion includes UE quality of service (QoS).

4. The method of claim 1 wherein the at least one UE centric criterion includes UE quality of experience (QoE).

5. The method of claim 1 wherein the measurement parameters include similarities among the plurality of wireless VTP configurations.

6. The method of claim 5 wherein the UE wireless channel measurement set includes a first group of UE wireless channel measurements for a first wireless VTP configuration of the plurality of wireless VTP configurations and excludes a second group of UE wireless channel measurements for a second wireless VTP configuration of the plurality of wireless VTP configurations, when the second group of UE wireless channel measurements correspond to at least one wireless TP allocation common to the first wireless VTP configuration and the second wireless VTP configuration.

7. The method of claim 1 wherein the UE wireless channel measurement set includes fewer UE wireless channel measurements in a frequency domain for less important wireless VTP configurations than for more important wireless VTP configurations.

8. The method of claim 1 wherein the UE wireless channel measurement set includes fewer UE wireless channel measurements in a time domain for less important wireless VTP configurations than for more important wireless VTP configurations.

9. The method of claim 1 wherein the measurement parameters include respective importance of the plurality of UEs.

10. The method of claim 9 wherein the UE wireless channel measurement set excludes UE wireless channel measurements for UEs not near a cell edge.

11. The method of claim 1 wherein the UE wireless channel measurement set includes wireless channel interference measurements having high received power more frequently in a time domain and a frequency domain than wireless channel interference measurements having low received power.

12. The method of claim 1 wherein the UE wireless channel measurement feedback includes UE wireless channel measurements made for a second wireless VTP configuration using pilots transmitted for UE wireless channel measurements for a first wireless VTP configuration.

13. The method of claim 1, wherein selecting the serving wireless VTP configuration comprises selecting the potential serving wireless VTPs for the serving wireless VTP configuration as respective serving wireless VTPs for the selected UE.

14. The method of claim 1, wherein the identifying the potential serving wireless VTPs, the scheduling the UE wireless channel measurement set, and the selecting the serving wireless VTP configuration are performed for multiple selected UEs.

15. A controller for a wireless communication system having wireless transmit points (TPs) serving a region within which a plurality of user equipments (UEs) are disposed, comprising:
a memory configured to store a plurality of wireless virtual transmit point (VTP) configurations according to which the wireless TPs are allocable into a plurality of wireless VTPs, wherein each of wireless VTP configuration represents an allocation of the wireless TPs;
a transceiver configured to transmit UE wireless channel measurement instructions to and receive UE wireless channel measurement feedback from the wireless TPs and a selected UE in the plurality of UEs; and
a processor coupled to the memory and the transceiver, and configured to:
identify, for each of the plurality of wireless VTP configurations, potential serving wireless VTPs for the selected UE according to at least one UE centric criterion,
schedule a UE wireless channel measurement set for the potential serving wireless VTPs for a scheduled wireless channel resource according to measurement parameters, wherein the measurement parameters include respective importance of the plurality of wireless VTP configurations, and wherein the respective importance is set according to how frequently each one of the plurality of wireless VTP configurations is selected as the serving wireless VTP configuration,
generate and cause the transceiver to transmit the UE wireless channel measurement instructions according to the UE wireless channel measurement set, and
select a serving wireless VTP configuration from the plurality of wireless VTP configurations in accordance with the UE wireless channel measurement feedback received from the selected UE by the transceiver.

16. The controller for the wireless communication system of claim 15 wherein the at least one UE centric criterion includes UE location.

17. The controller for the wireless communication system of claim 15 wherein the at least one UE centric criterion includes UE quality of service (QoS).

18. The controller for the wireless communication system of claim 15 wherein the at least one UE centric criterion includes UE quality of experience (QoE).

19. The controller for the wireless communication system of claim 15 wherein the measurement parameters include similarities among the plurality of wireless VTP configurations.

20. The controller for the wireless communication system of claim 19 wherein the UE wireless channel measurement set includes a first group of UE wireless channel measurements for a first wireless VTP configuration of the plurality of wireless VTP configurations and excludes a second group of UE wireless channel measurements for a second wireless VTP configuration of the plurality of wireless VTP configurations, when the second group of UE wireless channel measurements correspond to at least on wireless TP allocation common to the first wireless VTP configuration and the second wireless VTP configuration.

21. The controller for the wireless communication system of claim 15 wherein the UE wireless channel measurement set includes fewer UE wireless channel measurements in a frequency domain for less important wireless VTP configurations than for more important wireless VTP configurations.

22. The controller for the wireless communication system of claim 15 wherein the UE wireless channel measurement set includes fewer UE wireless channel measurements in a time domain for less important wireless VTP configurations than for more important wireless VTP configurations.

23. The controller for the wireless communication system of claim 15 wherein the measurement parameters include respective importance of the plurality of UEs.

24. The controller for the wireless communication system of claim 23 wherein the UE wireless channel measurement set excludes UE wireless channel measurements for UEs not near a cell edge.

25. The controller for the wireless communication system of claim 15 wherein the UE wireless channel measurement set includes wireless channel interference measurements having high received power more frequently in a time domain and a frequency domain than wireless channel interference measurements having low received power.

26. The controller for the wireless communication system of claim 15 wherein the UE wireless channel measurement feedback includes UE wireless channel measurements made for a second wireless VTP configuration using pilots transmitted for UE wireless channel measurements for a first wireless VTP configuration.

27. The controller for the wireless communication system of claim 15, wherein the processor configured to select the serving wireless VTP configuration comprises the processor configured to select the potential serving wireless VTPs for the serving wireless VTP configuration as respective serving wireless VTPs for the selected UE.

28. The controller for the wireless communication system of claim 15, wherein the processor is configured to identify the potential serving wireless VTPs, to schedule the UE wireless channel measurement set, to generate and cause the transmit the UE wireless channel measurement instructions, and to select the serving wireless VTP configuration, for multiple selected UEs.

* * * * *